Sept. 30, 1969        L. S. MEYER        3,470,051
FORMATION OF REINFORCED PLASTIC RODS AND TUBES
Filed Aug. 5, 1965        5 Sheets-Sheet 1
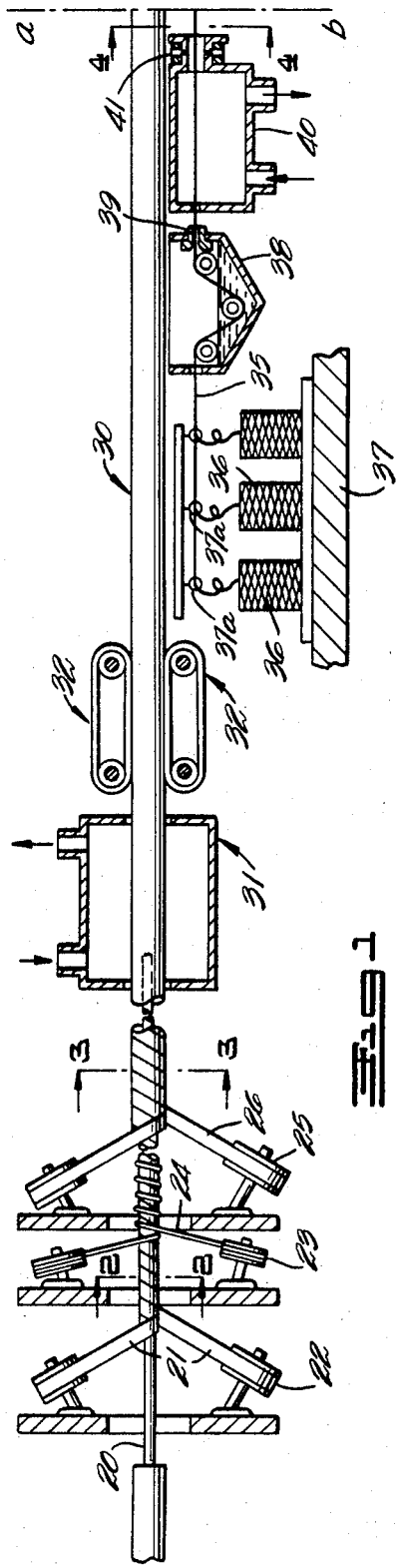
INVENTOR.
LEONARD S. MEYER
BY MAHONEY, MILLER & RAMBO
ATTORNEYS

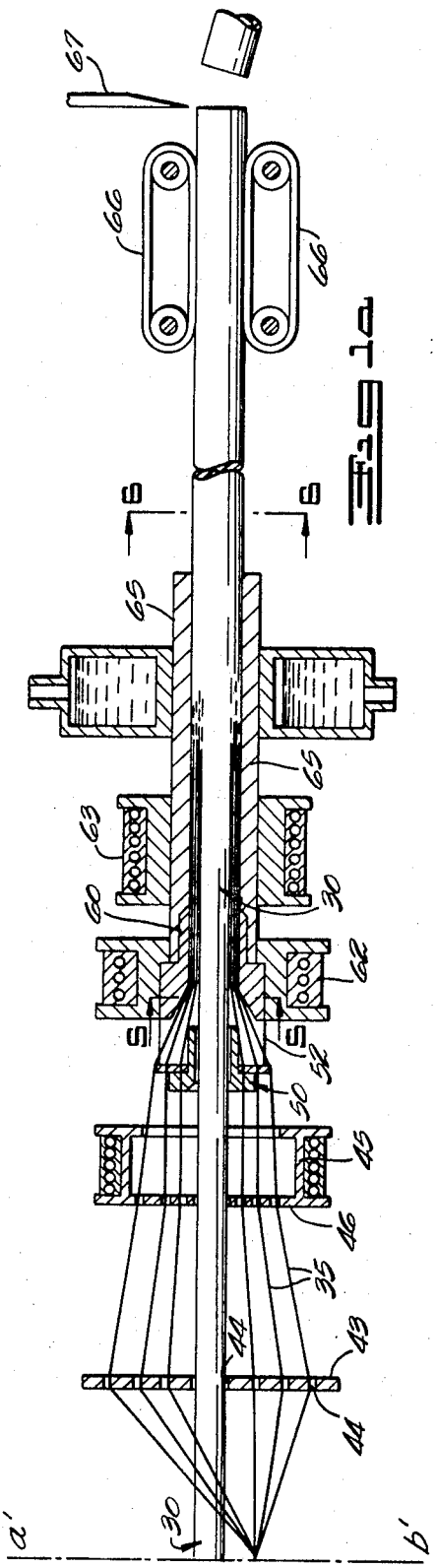

Sept. 30, 1969 L. S. MEYER 3,470,051
FORMATION OF REINFORCED PLASTIC RODS AND TUBES
Filed Aug. 5, 1965 5 Sheets-Sheet 3
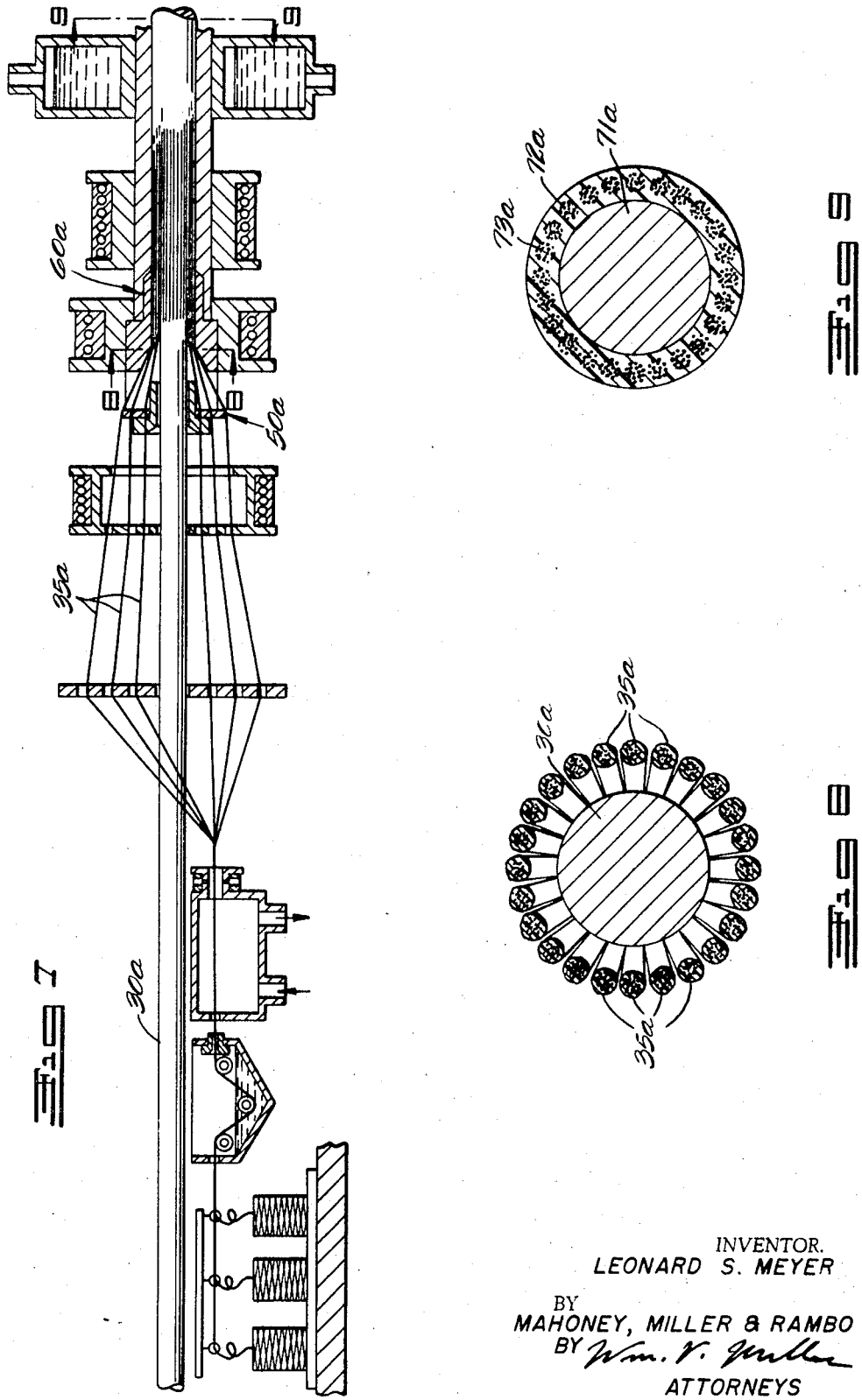
INVENTOR.
LEONARD S. MEYER
BY
MAHONEY, MILLER & RAMBO
BY
ATTORNEYS

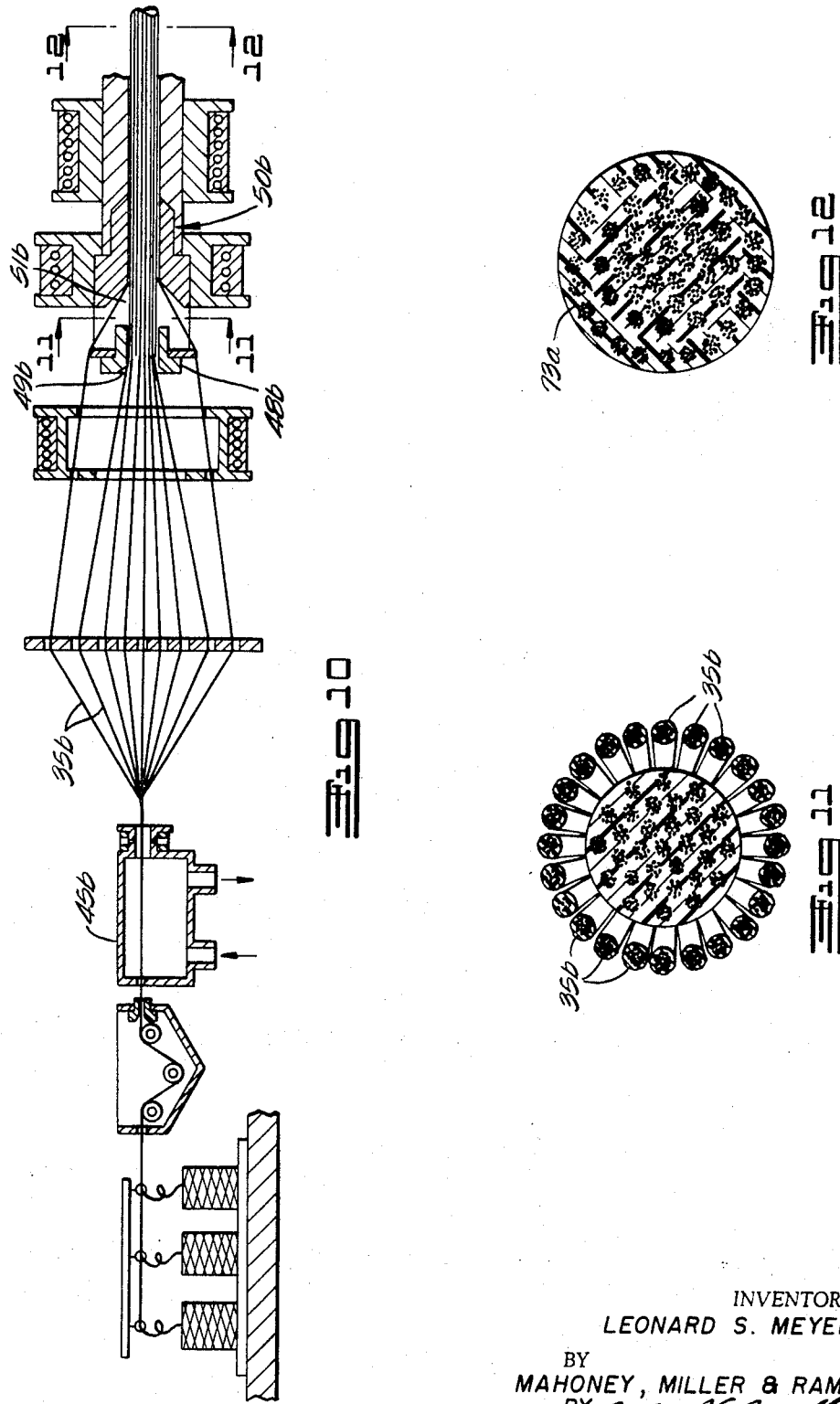

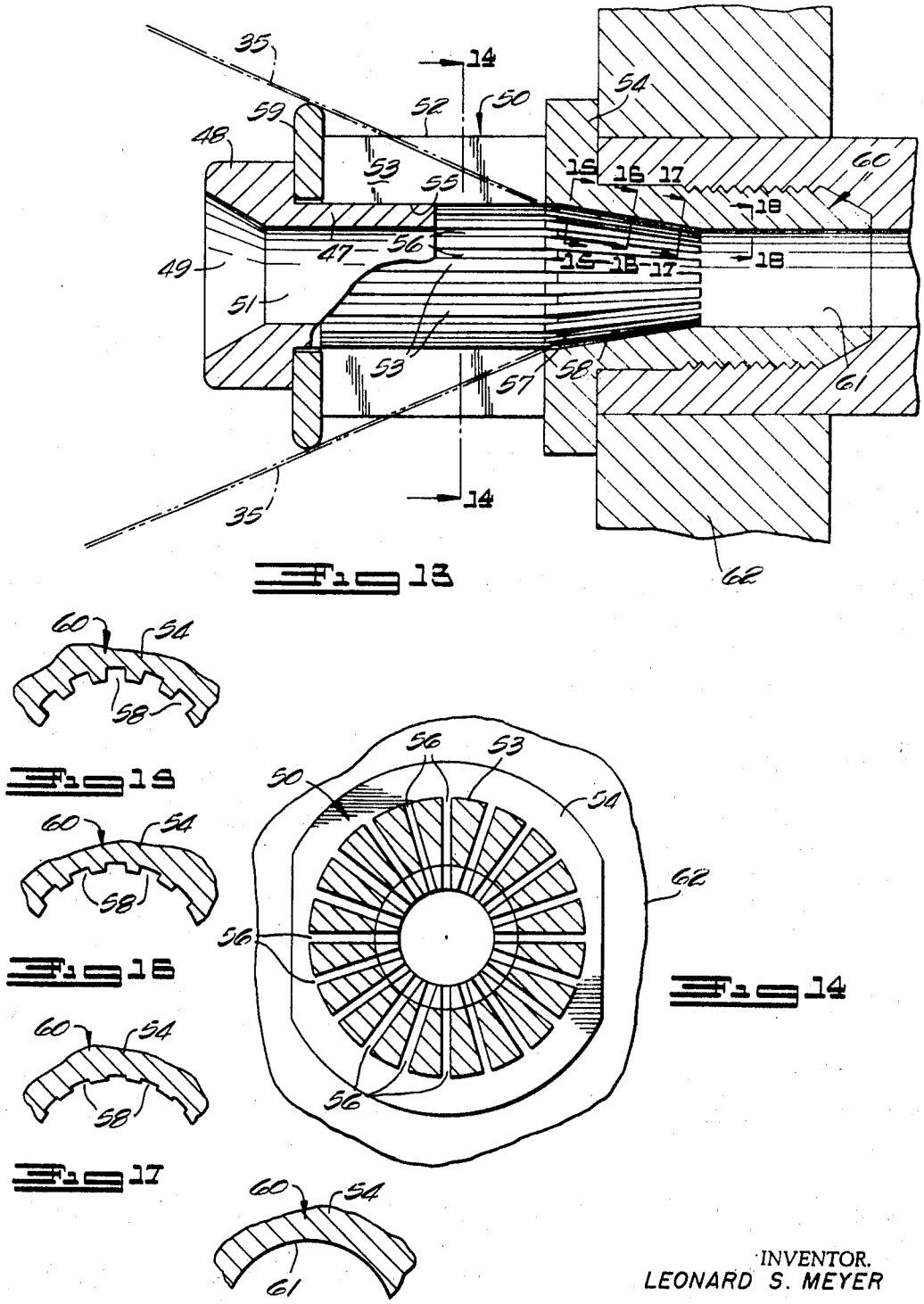

United States Patent Office

3,470,051
Patented Sept. 30, 1969

3,470,051
FORMATION OF REINFORCED PLASTIC RODS AND TUBES
Leonard S. Meyer, 5920 Lakeshore Drive, Columbia, S.C. 29206
Filed Aug. 5, 1965, Ser. No. 477,544
Int. Cl. B32b *1/08, 31/08*
U.S. Cl. 156—171                 10 Claims

ABSTRACT OF THE DISCLOSURE

The formation of reinforced plastic rods either as hollow tubes or solid rods which include an outer layer of longitudinally extending, exactly parallel, reinforcing glass fiber roving, impregnated with a resin-emulsion. The outer layer may be formed on core material or the core and the layer may be produced simultaneously.

---

The present invention deals broadly with the general type of rod or tube, as well as the process of forming it, disclosed by my Patent No. 2,694,661.

The method disclosed in said patent was desirable in that it did produce high-quality rods with smooth surfaces but the application of the molding or embracing film to the formed but uncured rod was both difficult and expensive.

Other methods now in use which are variations of the pulltrusion method, an example of which is illustrated in said patent, all fall short of desired standards of surface smoothness, straightness, accurate resin-binder control, wall thickness control, concentricity, and precise fiber orientation. Most commonly used prior art methods require centerless grinding to produce a round smooth outside surface of selected diameter on the rod. One method uses a helical film pressure wrap, but this produces on the outer surface of the rod a helical marking from the film used. Another method, using woven sleeving on the outer surface of the rod, produces a fabric-like surface. Still other methods, using such woven sleeving or fabric encased in film or mold are not continuous and have a material seam or joint which causes non-uniformity. No continuous prior art process is known to produce highly accurate and precisely oriented reinforced plastic rods, and especially rods as thin wall tubes, suitable for such applications as low-cost arrow shafting or nonporous electrical insulation.

The term "rod" is used herein generally to indicate either a solid rod or a hollow rod or tube. The present invention is applicable to both hollow rods or tubes as well as solid rods. However, in the production of the hollow rods or tubes according to this invention there are additional novel and patentable factors as compared to the production of solid rods according to this invention. These factors will appear as this description progresses.

There are four general concepts involved in the present invention as follows:

(1) The production of hollow rods or tubes by the use of a prefabricated tubular core of any suitable heat-resistant material such as metal, extruded plastic, etc., and the application in a novel manner of an outer layer thereto which comprises longitudinally extending, parallel fibers embedded in plastic.

(2) The production of hollow tubes or rods by first producing a hoop sandwich core in a novel manner and then applying in a novel manner to the hoop sandwich core an outer layer which comprises longitudinally extending, parallel fibers embedded in plastic.

(3) The production of a solid rod by using a solid core of any suitable heat-resistant material such as metal, wood, reinforced plastic, etc., and applying thereto in a novel manner an outer layer which comprises longitudinally extending, parallel fibers embedded in plastic.

(4) The production of solid rods by combining resin-impregnated, longitudinally extending, parallel strands or roving of fibers to form both the solid body or core of the rod as well as the outer layer of material consisting of the longitudinally extending, parallel fibers embedded in plastic.

In each of the above-indicated processes, an outer layer of longitudinally extending, parallel, reinforcing fiber roving, impregnated with a resin-emulsion, is applied in surrounding relationship to the core or body of the rod and the application is accomplished, in a novel manner according to this invention, without distorting the longitudinal fibers from their parallel relationship. Such distortion in prior art processes weakens the rods and makes the production of straight rods impossible.

The accompanying drawings illustrate the manner in which both hollow and solid rods can be formed continuously in accordance with my present invention and apparatus which can be used effectively in forming the rods.

In these drawings:

FIGURE 1 is a diagrammatic view in longitudinal elevation and section illustrating the first steps of the process according to this invention of forming a hollow tube wherein a hoop sandwich core is first produced.

FIGURE 1a is a continuation of the view in FIGURE 1 illustrating successive steps of the process in completing the tube.

FIGURE 2 is an enlarged transverse sectional view taken along line 2—2 of FIGURE 1.

FIGURE 3 is an enlarged transverse sectional view taken along line 3—3 of FIGURE 1 through the mandrel-supported hoop sandwich core.

FIGURE 4 is an enlarged transverse sectional view taken along line 4—4 of FIGURE 1 through a strand of the fiber roving reinforcement.

FIGURE 5 is an enlarged transverse horizontal sectional view taken along line 5—5 of FIGURE 1a through the hoop sandwich core as the reinforcing roving is being applied thereto.

FIGURE 6 is an enlarged transverse sectional view taken along line 6—6 of FIGURE 1a through the completely formed tube.

FIGURE 7 is a view similar to FIGURE 1a but illustrating the formation of a solid rod rather than a hollow tube.

FIGURE 8 is an enlarged transverse sectional view taken along line 8—8 of FIGURE 7 through the rod core as the reinforcing roving is being applied thereto.

FIGURE 9 is an enlarged transverse sectional view taken along line 9—9 of FIGURE 7 through the completed rod.

FIGURE 10 is a view similar to FIGURE 7 but illustrating the formation of a solid rod in a different manner.

FIGURE 11 is an enlarged transverse sectional view taken along line 11—11 of FIGURE 10 showing the incorporation of the longitudinal reinforcement in the core and outer surface of a solid rod.

FIGURE 12 is an enlarged transverse sectional view taken along line 12—12 of FIGURE 10 through the completed rod.

FIGURE 13 is an enlarged axial sectional view through a novel guide spider used in the process.

FIGURE 14 is a transverse sectional view taken along line 14—14 of FIGURE 13.

FIGURE 15 is an enlarged detail in section taken along line 15—15 of FIGURE 13.

FIGURE 16 is a similar section taken along line 16—16 of FIGURE 13.

FIGURE 17 is a similar section taken along line 17—17 of FIGURE 13.

FIGURE 18 is a similar section taken along line 18—18 of FIGURE 13.

In making the rods, either solid or hollow, according to my invention, it is preferred that the reinforcing fiber material be of glass fibers and the adhesive used for impregnating and surrounding or embedding the fibers be a synthetic resin material but other materials may be employed.

An example of a continuous process for making a hollow rod or tube is illustrated in FIGURES 1 to 6. By this method, long rods can be formed in a continuous process. This method involves the formation of a hoop sandwich hollow tube in a novel manner and the application to the exterior thereof of high-tensile strength glass fiber roving with the roving extending longitudinally of the core in spaced parallel relationship around the core with the longitudinal parallel relationship accurately maintained until setting of the resin which is previously applied to the roving to impregnate and coat it.

A steel mandrel 20 is suitably mounted in a fixed position as indicated in FIGURE 1 and is helically wound with two or more layers of nonwoven webbing or tape 21. The tape is applied by means of a motor-driven radial let-off of a type commonly used in the art and indicated generally at 22. This tape 21 can be cellulose, asbestos, rayon, plastic, paper, fabric, or other web materials. A suitable adhesive is used to impregnate these layers and cement overlapping layers together which is of such a nature that it will not soften during subsequent operations of the process. Examples of suitable adhesives are dextrin, resorcinol formaldehyde, urea formaldehyde, etc. This combined layer of tape must be of at least two plies (FIGURE 2) and can be made with one web lapped 50% but it is preferred that it be made with two webs butted and seam staggered.

Over the helically wound layers of tape 21, a second radial let-off unit 23 applies hoop wound or helically wound continuous glass fiber or roving 24 onto the inner laminated tube. This fiber 24 is likewise impregnated with a suitable resin binder or adhesive, which may be one of the materials indicated above as a suitable adhesive and which will withstand subsequent steps of the process. A third radial let-off 25 applies an outer tape 26 helically around the helical strand 24 on the laminated tube to complete the hoop sandwich. This tape 26 is also impregnated with a suitable binder of the type mentioned above before it is wrapped on the tube.

This procedure provides a core, indicated generally by the numeral 30, and shown in cross-sectional detail in FIGURE 3. It comprises the two inner layers of helically wound overlapping tape 21, the two outer layers 26 of overlapping tape, with the helically wound reinforcing glass fiber reinforcing strand or roving 24 disposed between the adjacent layers 21 and 26. The tape and the roving, as previously indicated, are all impregnated and covered with a coating of adhesive which will cause the layers of the laminated hoop sandwich core body to adhere until the uncured or partially cured adhesive or resin sets.

The setting of the resin is accomplished by passing the continuously traveling core 30, as it leaves the axially fixed mandrel 20, into a drying and/or curing oven 31 which sets the adhesive or cures the uncured or partially cured resin used in producing the core. This oven 31 will be at a temperature ranging from 150° to 400° F. for adhesives of the type previously indicated. This will cause the inner laminations 21 to fuse together and the outer laminations 26 to fuse together with the helical reinforcement 24 being fused to the adjacent respective layers 21 and 24, being fixed in the annular space therebetween.

The final core structure will, in cross section, be of the structure indicated in FIGURE 5.

The dried, cured core 30 passes from the oven 31 through a puller unit 32, which is shown as being positively driven upper and lower belts which engage the core at its upper and lower sides to grip it therebetween and exert a pulling force on it. This puller unit 32 serves to continuously move the core off the mandrel 20, as it is formed, and into the oven 31.

In order to butt each tape layer formed of the tapes 21 and 26, if desired, apply controlled amounts of hoop fiber 24, and match the core production speed to the final tube production speed, the units for performing these operations will be linked together by suitable belt, chain, or gear trains of suitable ratios, which are not shown as they are well known.

The core 30, after it is dried or cured, is continuously moved on to successive operations which apply an outer layer of resin embedded reinforcing fibers which extend longitudinally thereof and are applied and maintained in angularly spaced parallel relationship concentric with the tube until the reinforced tube is completely finished and the resin thereof is set or cured. The reinforcing used is preferably glass fiber roving or strand material 35 which may be supplied in the form of a plurality of spools 36 which are arranged on a suitable support 37. The roving 35 is arranged to let off from the spools 36 through a plurality of guides 37a into an impregnation tank 38. The glass roving on the spools 36 preferably has a suitable fiber finish thereon such as chrome methacrylate or vinyl silane which improves wetting of the resin and its adhesion to the fiber but it may have finishes of other similar materials. The tank 38 will contain a resin emulsion through which the roving 35 is passed to impregnate and coat the glass fiber roving. A polyvinyl chloride emulsion, such as B. F. Goodrich Geon Latex #351 unplasticized or #576 plasticized, can be used at approximately 55% solids to wet out and impregnate the fiber 35 as it is drawn through the tank. Polystyrene emulsion, such as Monsanto Lytron Latex 201 or 222, is another example of a suitable resin emulsion which can be used. Other resin emulsions which can be used are DuPont Nylon 6 and Union Carbide Polysulfone.

Each glass fiber roving or strand 35 is passed separately through an outlet orifice 39 of the tank 38. The diameter of this orifice is such that it removes all but a slight excess over the final desired resin solids, for example, polyvinyl chloride. The orifice does, of course, take the water of the emulsion present at this point into account. The final resin solids desired after removal of water are 20% to 55%, with the remainder fiber, depending on end use requirements. Before the roving passes through the orifice 39 it is a loose bundle of fibers but the orifice contracts the roving into a smaller diameter to compress the fibers into a tighter cross section.

The impregnated and coated roving 35 then passes through a dryer 40 where hot air, at a temperature ranging from about 130° to 180° F., removes the water and leaves the desired binder resin in and on the roving as a layer of fine powder. The dry impregnated roving cannot be handled or passed over simple guides without the loss of this fine powdered binder and, therefore, the hot bushings 41 are built into the exhaust end of the dryer 40 so as to fuse this powder into a homogeneous layer 42 as indicated in FIGURE 4. These hot bushings are at a temperature of from about 200° to 550° F. depending on the resin system used.

The apparatus so far described is in FIGURE 1 and FIGURE 1a shows a continuation of the apparatus, the junction of this apparatus being at the transverse lines a–b and a'–b', respectively, in these figures.

From the dryer 40, the fused impregnated roving 35 is then passed through an upright transversely disposed distributing plate 43 which has guide openings arranged therein in a circular pattern around a central larger guide opening 44 through which the core 30 is passed continuously. The roving 35 and the core 30 surrounded thereby then pass into a preheating oven 45 which has a guide plate 46 at its inlet side that is similar to the plate 43. The temperature in this oven is about 350° F. to 650° F. again depending on the particular resin.

From the preheating oven 45 the roving-surrounded core material passes into a special spider 50 where the annular group of roving strands or fibers 35 are led inwardly into embracing relationship to the outer surface of the core 30 but at the same time are kept in exactly angularly spaced, parallel relationship. The structure of this special orifice and guide spider 50 is illustrated in detail in FIGURES 13–18. It comprises an inner tubular bushing 47 which has an enlarged head 48 with a flared inlet passage 49 for receiving and centering the core 30 and leading it into the central elongated core passageway 51 formed therein. The tubular portion of the bushing 47 extends into and about one-half of the axial extent of a concentric surrounding slotted sleeve 52. The slotted sleeve is formed of blades 53 of segmental form which extend longitudinally and project rearwardly from a collar 54 with which they may be integrally formed. These blades 53 are of equal width and are equally spaced angularly to provide a central passage 55 for receiving the bushing 47 and the radial slots 56 through which the roving 35 will pass. Thus, since the slots 56 are angularly disposed around the guide spider 50, if the roving strands 35 are passed inwardly and forwardly through the slots 56, as indicated, they will be maintained in equally spaced relationship around the core 30 which will be passed through the central guide passage 51 of the bushing 47 and through the axially aligning central passage 55 of the slotted sleeve 52. Between the head 48 of the bushing 47 and the rear end of the slotted sleeve 52, a washer 59 is clamped and extends radially outwardly beyond the sleeve 52 so that its peripheral edge serves as a guide for the roving as it is brought into the slots 56 of the sleeve 52. The collar 54 is integral with a tubular forming die 60 which projects axially forwardly therefrom. An inwardly converging passage 57 is formed in the collar and connected die and the surface of this passage is provided with slots or grooves 58 which are uniformly angularly spaced and are in alignment with and continuations of the slots 56. These slots 58 extend longitudinally into the tubular or nozzle passage 61 of the die 60 and, as indicated in FIGURES 15–18, gradually decrease in depth until they merge with the cylindrical surface of the die. These slots guide the roving strands farther inwardly toward the axis of the forming die 60.

The central forming cavity passage 61 of the die 60 extends axially therethrough and is in axial alignment with the central passages 51 and 55 of the respective members 47 and 52. The passage 61 will be of substantially the same internal diameter as the passage 51 which will be slightly greater than the external diameter of the core 30. The die 60 is surrounded by a heater 62 which is of a suitable type to maintain the temperature in the die at about 400° to 700° F. depending on the resin system being used.

The resin on the roving 35 is melted fully by the preheater oven 45 before it reaches the spider 50 and the forming die 60. The core enters the die 60 and simultaneously, the roving is guided into closely surrounding relationship therewith with the roving arranged as a layer of longitudinally extending fibers around the surface of the core 30 as indicated in FIGURE 5. Leading the fiber roving inwardly through the slotted and grooved spider 50 results in applying them to the core in equally spaced relationship around the outer surface of the core and in maintaining the longitudinally extending fibers in exact parallel relationship as they are applied as an outer layer to the core. The fibers are gradually guided into embracing relationship with the core by the spider 50 and are compacted thereagainst by the extrusion die 60. As previously indicated, the amount of resin impregnating and on the roving has been adjusted to a slight excess and as the roving passes through the slots and grooves of the spider 50, an excess of the resin is forced rearwardly out of the die cavity 61. This action serves to produce an air and void-free product and would distort the longitudinal fibers except for the spider guide grooves.

From the orifice and guide spider 50, the material now in rod form enters a slip tube 65. This tube 65 may be of Teflon or other suitable non-stick material and is mounted on the die 60 as an axial continuation thereof. A heater 63 is provided around this tube immediately beyond the die 60 so as to provide heat for a stress-relieving zone where the temperature will be about 200° F. to 500° F. depending on the resin used. In this zone, the material of the rod or tube will remain plastic for a sufficient period to stress-relieve or straighten itself and then will move on through a cooling and final solidification zone. At this final zone, the main pulling power is provided by a propelling unit 66 and it may be moved into association with a suitably timed cutting unit 67 for cutting it into predetermined lengths.

The resulting final hollow tube will appear as in FIGURE 6 with the central passage 70 extending therethrough, the surrounding concentric wall or mass 71 formed by the cured laminations 21 and 26 and the embedded helical reinforcement 24, and the surrounding outer layer 72 formed by the embedded longitudinally extending, parallel reinforcement 73. Thus, a continuous hollow reinforced tube is produced. Instead of one layer 72 of embedded parallel, longitudinal reinforcement, two or more layers may be provided by feeding the roving onto the core in the desired number of layers.

Suitable temperatures for different examples of resin systems at the various stages of the process are summarized in the table below but it will be understood that temperatures will vary with variations in speed of the progression of the forming process.

| | Degrees F. | | | | |
|---|---|---|---|---|---|
| | Styrene | P.V.C. (plas.) | P.V.C. (unplas.) | Nylon 6 | Polysulfone |
| Drying (31) | 180 | 180 | 180 | 200 | 200 |
| Fusing (41) | 350 | 250 | 350 | 450 | 550 |
| Preheat (45) | 400 | 350 | 450 | 550 | 600 |
| Form die (60) | 450 | 400 | 500 | 600 | 650 |
| Stress relief (63) | 250 | 225 | 300 | 450 | 500 |

As described above, a hollow tube is produced but the process can be employed with slight modification to produce a solid reinforced rod. The solid rod may be produced in the manner indicated in FIGURES 7 and 8 and the resulting rod is indicated in FIGURE 9. The process will be substantially the same except that a prefabricated solid core 30a will first be produced in a suitable manner and may be of various heat-resistant materials but is indicated as being a smooth-surface metal rod. The outer layer of parallel roving 35a will be applied to the exterior of the solid core 30a in exactly the same manner as by the use of the slotted spider 50a which causes the roving strands to converge around the moving solid core as it passes through the die 60a. The steps of forming the outer layer of the solid rod which are indicated in FIGURES 7 and 8 are exactly the same as those indicated in FIGURE 1a for forming the hollow rod, but instead of using a hollow, laminated core 30, the solid core 30a is used as indicated above. The resulting rod is indicated in FIGURE 9 and will include the solid core or body 71a with the outer annular layer 72a formed by the embedded, longitudinally extending, parallel strand reinforcement 73a.

Another way in which a solid rod can be produced according to this invention is illustrated in FIGURES 10 to 12. In this case, the solid core or body is formed simultaneously with the outer annular reinforced surface layer. This is accomplished by dividing the longitudinally moving impregnated roving strands 35b as they leave the preheater 45b, and directing some into a bundling core bushing 48b, which has the flared inlet 49b leading into the central passage 51b, and others into the guide spider 50b in exactly the same manner as before. The formation of the final body or core with a surrounding reinforced outer layer is indicated in FIGURE 11 and the final rod is indicated in FIGURE 12. In the final rod, the reinforcing strands 73a will be uniformly distributed throughout the core or body and the surface of the rod and the reinforcement at the surface layer will be in exact longitudinally extending, angularly spaced, parallel relationship.

It will be apparent that this invention provides a continuous method of forming rods, either hollow or solid, continuously and automatically from fiber reinforcing and adhesive binders. The reinforcing preferred is glass fiber material and the adhesives are preferably resins as indicated. The reinforcing materials employed can be nonwoven in both web form and continuous fiber form. The resin used can be in water emulsion form without expensive organic solvents. The reinforcing fibers can be oriented both in angular direction and longitudinally for maximum strength. The fiber guiding slots and grooves of the spider and the connected forming die keep the parallel alignment of the fibers and resist the high distortion back pressure of the high viscosity resins used (500,000 centipoises). The reinforcing, longitudinal fibers can be placed at the exterior surface of the rod where maximum bending stresses occur. In the case of the hollow rod, the sandwich construction of the hoop fibers between the non-woven layers can be used and produces maximum strength at minimum weight. Prefabricated cores may be used or the hollow or solid cores may be produced according to this invention by the procedures described above. The resin to reinforcement ratio in the product is automatically and exactly controlled by the spider orifice and associated die which meter off a slight excess of resin. The sandwich hoop laminate core when used is of smooth surface and of precise diameter even before the outer parallel fiber reinforcement is applied thereto. Thin wall tubing can be made by this method to accurate dimensions of inside and outside diameter plus accurate concentricity. Straight rods and tubes can be made due to the special spider design and location which preserves longitudinal fiber orientation. The laminated tube construction is inherently gas-tight, due to multiple layers, some of which are non-woven spirally lapped. Gas-tight construction is important both for electrical applications and as pressurized container construction. In all procedures described and followed according to this invention, the reinforcing longitudinal fibers are embedded in the resin at the surface of the rod and are accurately spaced angularly and extend longitudinally in exact parallel relationship which results in increased strength as compared to prior art rods in which the reinforcing fiber strands are not accurately oriented.

According to the provisions of the patent statutes, the principles of this invention have been explained and have been illustrated and described in what is now considered to represent the best embodiment.

Having thus described this invention, what is claimed is:

1. The method of forming a rod which comprises continuously and progressively performing the following steps:

(1) feeding longitudinally extending parallel strands of roving of glass fibers through a bath of an emulsion or dispersion of water and binder resin solids to impregnate the roving with the resin emulsion;
 (2) passing the parallel strands of resin-impregnated roving separately through orifices to remove all but a desired excess over the final desired resin solids and to contract the roving strands into tighter cross section;
 (3) drying the roving strands to remove the water and leave the desired binder resin in and on the impregnated roving strands as powder;
 (4) heating the roving strands to fuse the resin powder carried thereby;
 (5) melting the fused resin on the roving strands;
 (6) passing the roving strands carrying the melted resin separately through guides to remove the excess resin and to maintain their exact parallel relationship as they are guided into a forming die where they are combined into an outer skin; and
 (7) treating the formed skin by subjecting it to a selected temperature condition to harden the resin thereof so that the glass fibers will be embedded in the resin in longitudinally extending, exactly parallel relationship.

2. The method of claim 1 in which the resin solids present after the drying of step 3 are in amounts ranging from 20% to 55% with the remainder fiber.

3. The method of claim 1 in which the formed skin is passed into and through a slip tube for the treatment of step 7.

4. The method of claim 3 in which the strands of resin-impregnated roving are guided around a central core as they are directed into the forming die.

5. The method of claim 4 in which the core is in the form of an axially fixed mandrel and the skin produced thereon as the roving strands move into the forming die will progressively move off the mandrel.

6. The method of claim 4 in which the core moves progressively through the die as the skin is produced thereon and is retained therein as a permanent core for the rod so formed.

7. The method of claim 6 in which the core is produced without an external mold before reaching the die by helically winding on a mandrel two or more overlapping layers of nonwoven tape impregnated with a binder, then helically winding on the overlapped helical layers continuous glass roving which is impregnated with resin binder, and helically winding two or more overlapping layers of nonwoven tape impregnated with a binder to cover the glass fiber roving; and continuously and progressively passing the core to and through the die while the skin is formed thereon.

8. The method of claim 1 in which said roving strands are guided according to step 6 into an extrusion die which has an axially extending forming chamber with a converging inlet and a tubular outlet, said converging inlet having longitudinally extending guide grooves opening radially inwardly and disposed at angularly spaced positions and gradually decreasing in depth in the direction of advancement of the roving strands to merge with the tubular outlet of the die.

9. An extrusion die for receiving a plurality of longitudinally disposed resin-impregnated rovings and combining them into a rod-like mass, said die having an axial forming passage with a converging radiused inlet and a tubular outlet to compress the rovings and remove excess resin from said rovings, said converging inlet having longitudinally extending guide grooves opening radially inwardly and disposed at angularly spaced positions and gradually decreasing in depth toward the outlet to merge with the tubular outlet.

10. A die according to claim 9 including a spider collar joined with said die at its inlet which has outwardly opening longitudinally extending radial slots formed therein which are in angular alignment with and communicate with said guide grooves.

References Cited

UNITED STATES PATENTS

| | | | |
|---|---|---|---|
| 1,663,732 | 3/1928 | Remark | 18—13 XR |
| 2,154,791 | 4/1939 | Wallace | 18—6 |
| 2,431,745 | 12/1947 | Flanagan | 117—161 |
| 2,694,661 | 11/1954 | Meyer | 156—180 XR |
| 2,741,294 | 4/1956 | Pancherz | 156—166 XR |
| 2,751,320 | 6/1956 | Jacobs et al. | 156—180 |
| 2,835,620 | 5/1958 | Bartlett | 154—49 |
| 2,918,104 | 12/1959 | Scott et al. | 156—180 |
| 3,068,134 | 12/1962 | Cilker et al. | 156—172 |
| 3,090,102 | 5/1963 | Jannarelli | 28—75 |
| 3,306,797 | 2/1967 | Boggs | 156—171 |

HAROLD ANSHER, Primary Examiner

D. J. FRITSCH, Assistant Examiner

U.S. Cl. X.R.

18—13; 156—172, 179, 180, 188, 244; 264—174